(12) United States Patent  
Kapoor et al.

(10) Patent No.: US 12,450,411 B2  
(45) Date of Patent: Oct. 21, 2025

(54) HAZARD GENERATING FOR SPECULATIVE CORES IN A MICROPROCESSOR

(71) Applicant: International Business Machines Corporation, Armonk, NY (US)

(72) Inventors: Shakti Kapoor, Austin, TX (US); Nelson Wu, Austin, TX (US); Manoj Dusanapudi, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 794 days.

(21) Appl. No.: 17/554,821

(22) Filed: Dec. 17, 2021

(65) Prior Publication Data

US 2023/0195981 A1    Jun. 22, 2023

(51) Int. Cl.
*G06F 30/33* (2020.01)
*G06F 9/30* (2018.01)
*G06F 9/38* (2018.01)
*G06F 12/0891* (2016.01)
*G06F 115/10* (2020.01)

(52) U.S. Cl.
CPC .......... *G06F 30/33* (2020.01); *G06F 9/30058* (2013.01); *G06F 9/3851* (2013.01); *G06F 12/0891* (2013.01); *G06F 9/3806* (2013.01); *G06F 9/3818* (2013.01); *G06F 2115/10* (2020.01); *G06F 2212/1008* (2013.01)

(58) Field of Classification Search
USPC ........................................................ 716/136
See application file for complete search history.

(56) References Cited

U.S. PATENT DOCUMENTS

| | | | |
|---|---|---|---|
| 9,298,626 B2 | 3/2016 | Busaba et al. | |
| 9,740,616 B2 | 8/2017 | Busaba et al. | |
| 10,795,841 B2 | 10/2020 | Iyer et al. | |
| 2019/0272119 A1* | 9/2019 | Brewer | G06F 12/0875 |

OTHER PUBLICATIONS

Aldinucci, M., et al., "Accelerating code on multi-cores with FastFlow", Proc. of Euro-Par 2011, LNCS, Bordeaux, France, May 2011, 10 pages.

(Continued)

*Primary Examiner* — Bryce M Aisaka
(74) *Attorney, Agent, or Firm* — Scully, Scott, Murphy & Presser, P.C.

(57) ABSTRACT

A system, mechanism, tool, programming product, processor, and/or method for generating a hazard in a processor includes: identifying one or more cache lines to invalidate in a second level memory of a processing core in the processor; invalidating, in response to identifying one or more cache lines to invalidate in the second level cache, the one or more identified cache lines in the second level memory; and invalidating, in response to invalidating the one or more identified cache lines in the second level memory, the corresponding one or more cache lines in a first level memory. In an aspect the hazard generating mechanism is triggered, preferably on demand, and includes in an approach searching for cache lines in the second level memory that are also in the first level memory.

20 Claims, 4 Drawing Sheets

(56) References Cited

OTHER PUBLICATIONS

Buchert, T., et al., "Methods for Emulation of Multi-Core CPU Performance", 2011 IEEE International Conference on High Performance Computing and Communications, Oct. 2011, 22 pages, Conference Paper.
Ganusov, I., et al., "Future Execution: A Prefetching Mechanism that Uses Multiple Cores to Speed up Single Threads", ACM Transactions on Architecture and Code Optimization, Dec. 2006, 26 pages, vol. 3, No. 4.
Anonymous, "Method for instruction cache coherence on a processor with disjoint level-2 caches", IP.com No. PCOM000010890D, IP.com Electronic Publication Date: Jan. 29, 2003, 5 pages.
Anonymous, "Method for enabling advanced load/validation instructions and a data-speculation validation structure without the use of snooping", IP.com No. IPCOM000022675D, IP.com Electronic Publication Date: Mar. 25, 2004, 4 pages.
Anonymous, Trace-Core Processors', IP.com No. IPCOM000199882D, IP.com Electronic Publication Date: Sep. 20, 2010, 17 pages.

* cited by examiner

HAZARD GENERATING FOR SPECULATIVE CORES IN A MICROPROCESSOR

BACKGROUND

The present invention relates to out-of-order executions in a processor, including a processor having multiple processing elements or cores, and more specifically to a method, system, tool, and/or mechanism to generate and/or introduce hazards in a processor for potentially faster validation testing of speculative core(s) in a microprocessor.

In a processor core, load and store instructions are issued in order, but the load and store instructions can be executed and completed out-of-order. The order that instructions are executed can be affected by the resources available for the load and store instructions and can also be affected by the order in which the data arrives from memory or is delivered to memory. Depending upon the requirements and the availability of these resources, the load and store instructions are finished out-of-order, but are not completed until all the older instructions have been completed. If an older instruction is not able to complete for any reason, then all younger store and load instructions typically are flushed and the original values in the affected resources are restored and the load/store instructions are re-executed. Another example of re-ordering in processor micro-architecture is when the load or store instructions locate the data in the first level (e.g., L1) data cache in a processor core but the processor core in the narrow window of processing the data in its L1 data cache loses that data to another processing core.

When designing and developing processors it is important that instructions are processed appropriately particularly in out-of-order, multithreaded (multi-processor core) processors. To insure a newly developed processor operates correctly it undergoes testing and debugging. One way to test processors under development is to cause ordering hazards to determine whether the processor properly processes and navigates the hazards. It can be very challenging to cause, in software, the out-of-order processing hazards described above. The software written to cause these ordering hazards can be very complicated and require a lot of time, thought, and development which effects the processor development cost. For example, creating in software the scenario where a processor core locates data for either a load or store instruction in the L1 data cache, but loses the data to another processor core in the narrow window while the processor core executes that load or store instruction can be difficult. These windows are normally a couple of cycles long, and a snoop from another processor core can take many tens of cycles. This functioning of the data cache hierarchy makes hitting this scenario very difficult in core simulation testing and also on hardware. This creates the chance during testing that the processor will escape the ordering hazards making visibility of the problem and debug on the silicon very time consuming which drives up the cost of the processor and impacts its quality.

It would be advantageous if these ordering hazards and windows could be caused in the hardware, preferably by a trigger, switch, or dial in firmware, which can be turned on for design validation or debugging a possible fail. The ability to control the creation of the ordering hazard and/or windows where data in the first level (L1) data cache is lost could enable faster mean time to failure improving the visibility of the failure case, and accordingly help with debugging and validation testing of the processor design.

SUMMARY

The summary of the disclosure is given to aid understanding of processing systems and methods, including out-of-order processing, and a system, mechanism, tool and/or techniques of triggering, generating, and/or introducing a hazard in a processor core, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the processor, its architectural structure and method of operation, and to the system, mechanism, tool and/or technique of triggering, generating, and/or introducing a processing hazard into a processor to achieve different effects.

In one or more embodiments, a system, mechanism, tool, programming product, and/or method to facilitate triggering, activating, generating, creating, and/or introducing hazard conditions to a processor is generally described. A system, mechanism, tool, programming product and/or method for generating a hazard in a processor is described that in one or more approaches includes: identifying one or more cache lines to invalidate in a second level memory of a processing core in the processor; invalidating, in response to identifying one or more cache lines to invalidate in the second level cache, the one or more identified cache lines in the second level memory; and invalidating, in response to invalidating the one or more identified cache lines in the second level memory, the corresponding one or more cache lines in a first level memory. In an embodiment the first level memory is a first level data cache in a processor core that is local to the processor core and the second level memory is a second level data cache in the processor, wherein the first level data cache is smaller and faster than the second level data cache. The second level data cache in a further aspect is local to the processor core. In a further embodiment, the processor is a multi-core processor, and the method is performed in one of the processor cores of the multi-core processor. The system, mechanism, tool, programming product, and/or method further includes in an approach triggering a hazard generating mechanism, wherein in response to triggering the hazard generating mechanism the hazard generating system identifies the one or more cache lines in the second level memory to invalidate. Triggering the hazard generating mechanism can according to an aspect be on demand, and in a further approach can be performed via firmware.

In a further embodiment identifying the one or more cache lines to invalidate in the second level memory can include searching the second level memory. Searching the second level memory in an approach includes a walk through the second level memory comparing cache lines in the second level memory with invalidating criteria. In one or more embodiments, searching the second level memory can include identifying one or more cache lines in the second level cache that are also in the first level memory, and in an aspect one or more cache lines in the second level memory that have an inclusivity bit set to indicate that the one or more cache lines are in the first level memory. Searching the second level memory in a further aspect can be performed according to an invalidating algorithm. The invalidating algorithm in an embodiment can include identifying only cache lines that have their inclusivity bit set, and in a further aspect identifying only even cache lines in the second level memory that have their inclusivity bit set, wherein setting the inclusivity bit in the second level memory indicates that the cache line is located in the first level memory. Identifying the one or more cache lines in the second level memory to invalidate can further include according to an approach reading an inclusivity bit in second level memory, wherein the inclusivity bit in the second level memory indicates the level of memory that owns a cache line. According to an aspect, the second level memory can communicate with the first level memory the corresponding one or more cache lines in the first level memory to communicate.

In one or more embodiments a processor is described, the processor being configured to: and/or having programming instructions embedded on a non-transitory media, such that the programming instructions in response to being executed by the processor, configure the processor to: identify one or more cache lines to invalidate in a second level memory of a processing core in the processor; invalidate, in response to identifying one or more cache lines to invalidate in the second level cache, the one or more identified cache lines in the second level memory; and invalidate, in response to invalidating the one or more identified cache lines in the second level memory, the corresponding one or more cache lines in a first level memory. The processor according to an embodiment is configured to, and/or programming instructions configure the processor to trigger a hazard generating mechanism, wherein in response to triggering the hazard generating mechanism the hazard generating system identifies the one or more cache lines in the second level memory to invalidate. The processor according to a further embodiment is configured to, and/or programming instructions configure the processor to have the second level memory communicate with the first level memory the corresponding one or more cache lines in the first level memory to invalidate, and/or according to an approach to search the second level memory, and in a further aspect search the second level memory according to an invalidating algorithm. The processor according to a still further embodiment is configured to, and/or the programming instructions configure the processor to read an inclusivity bit in second level memory, wherein the inclusivity bit in the second level memory indicates ownership of a cache line.

Further features as well as the structure and operation of various embodiments are described in detail below with reference to the accompanying drawings.

BRIEF DESCRIPTION OF THE DRAWINGS

The various aspects, features, and embodiments of a processor, processor system, and/or method of processing data, including a system, mechanism, tool, and/or technique for triggering, activating, initiating, generating, creating, and/or introducing a hazard into a processor, for example to facilitate testing of the processor will be better understood when read in conjunction with the figures provided. Embodiments are provided in the figures for the purpose of illustrating aspects, features, and/or various embodiments of the processor, processor system, and methods of managing and processing data, including a system, mechanism, tool, and/or technique for triggering, activating, initiating, generating, creating and/or introducing hazards in a processor, but the claims should not be limited to the precise system, embodiments, methods, processes and/or devices shown, and the features, and/or processes shown may be used singularly or in combination with other features, and/or processes.

It may be noted that a numbered element is numbered according to the figure in which the element is introduced, is often, but not always, referred to by that number in succeeding figures, and like reference numbers in the figures often, but not always, represent like parts of the illustrative embodiments of the invention.

DETAILED DESCRIPTION

The following description is made for illustrating the general principles of the invention and is not meant to limit the inventive concepts claimed herein. In the following detailed description, numerous details are set forth in order to provide an understanding of a processor, its architectural structure, and its method of operation, including more specifically a system, mechanism, tool, and/or technique to trigger, generate, and/or introduce processing hazards in a processor, for example, to facilitate processor testing validation, however, it will be understood by those skilled in the art that different and numerous embodiments of the processor, its architectural structure, and method of operation, including numerous embodiments of a system, mechanism, tool, and/or technique to trigger and/or facilitate generating and/or introducing hazards in a processor, for example to test the processor, may be practiced without those specific details, and the claims and invention should not be limited to the embodiments, subassemblies, features, processes, methods, aspects, features or details specifically described and shown herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

A processor may process instructions by executing the instruction in a series of small steps. In some cases, to increase the number of instructions being processed by the processor (and therefore increase the speed of the processor), the processor may be pipelined. Pipelining refers to providing separate stages in a processor where each stage performs one or more of the small steps necessary to execute an instruction. In an example, the pipeline (in addition to other circuitry) may be placed in a portion of the processor referred to as the processor core. Some processors may have multiple processor cores (e.g., multiprocessor system), and in some cases, each processor core may have multiple pipelines. Where a processor core has multiple pipelines, groups of instructions (referred to as issue groups) may be issued to the multiple pipelines in parallel and executed by each of the pipelines in parallel. The pipeline(s) may include multiple stages, such as a decode stage, a dispatch stage, an execution stage, etc. The execution stage may include execution units that process different types of operations as specified by the instructions. For example, a load store unit (LSU) is an execution unit that processes, for example, load instructions and store instructions.

In an example, the physical addresses of store and load instructions that are committed may be stored as entries in one or more load store queues (LSQs) of a LSU. The LSQs may include load refresh queues (LRQs) and store reorder queues (SRQs). In an example, the SRQs and LRQs may reside in a local memory, such as a L1 data cache of a processor core. The entries in the SRQs may be store instructions that are committed, where committed store instructions may be store instructions that are completed by a thread, a processor core, or processing element, the completion cannot be undone, and other processing elements are not aware of the completion until the SRQ is drained to global memory (e.g., a level three (L3) cache, or other memory accessible and shared by more than one processing element/core). Upon draining a SRQ or a committed store instruction to global shared memory, a value being stored or updated in a memory address specified by the committed store instruction may be visible to all processors or processing elements among the multiprocessor system.

In an example, physical addresses associated with a load instruction may be stored as entries in the LRQs such that load instructions may be tracked by the LRQs. The entries in the LRQ may be load instructions that are waiting to be completed or retired by the processor core. In an example, load instructions and store instructions may be issued in order, but may be completed out of order due to various factors, such as different software or application implementations, dependencies on other threads, available resources, an order in which the data being stored arrives to global shared memory, or data being loaded from the global shared memory, etc. Depending on the requirements and the availability of resources, the load and store instructions can be completed out-of-order, and may not be completed until all the older load and store instructions have been completed. If an older instruction is not completed for any reason, then all younger load and store instructions typically are be flushed, and the original values in the affected resources are restored and re-executed.

For example, when a LSU executes a load instruction, the LSU may check in the LRQ to identify any younger load instructions (e.g., load instructions that arrived later than the load instruction) that have the same target as the load instruction, and that has already executed. In response to identifying such a younger load instruction, the younger load instruction may need to be re-executed in order to maintain sequential load consistency and to ensure that the younger load instruction does not read an improper value from the target. In an example, a younger load instruction may complete before an older load instruction when the older load instruction is waiting for data necessary for its completion.

To validate or test out-of-order processing logic, hazards and/or scenarios can be introduced to the processor to stress the processor and facilitate testing and validation of a processor's design and logic. In an example, software may be implemented to create out-of-order hazards to test and validate load and store coherence. However, this software may be relatively complicated to design, resulting in higher development costs for such processors. In addition, the time to design, develop, and test this software on different computer architectures can be very complicated, time consuming, and increase the cost of processor development. Further, as various computer architecture designs change and become more complicated, this software may also need to be redesigned and changed to accommodate the architecture changes.

To be described in more detail below, systems, mechanisms, tools, programming instructions, and/or techniques may be utilized to create and/or control hazards intended to stress a processor to facilitate testing of the processor, where in an embodiment the system, mechanism, tools, and/or techniques can be selectively switched on and off (e.g., by firmware). For example, the system, mechanism, tool, programming instructions, and/or techniques can be switched on for validation purposes or debugging a possible failure, and may be switched off at other times. Also, the system, mechanism, tool, programming, and/or techniques can be implemented in different computer architectures without a need for software changes. The utilization of the disclosed system, mechanism, tool, programming, and/or techniques to implement these hazards may reduce the cost of processor development, and may enable faster mean time to identify failure, thus improving the visibility of fail cases in processors.

Figure 1:
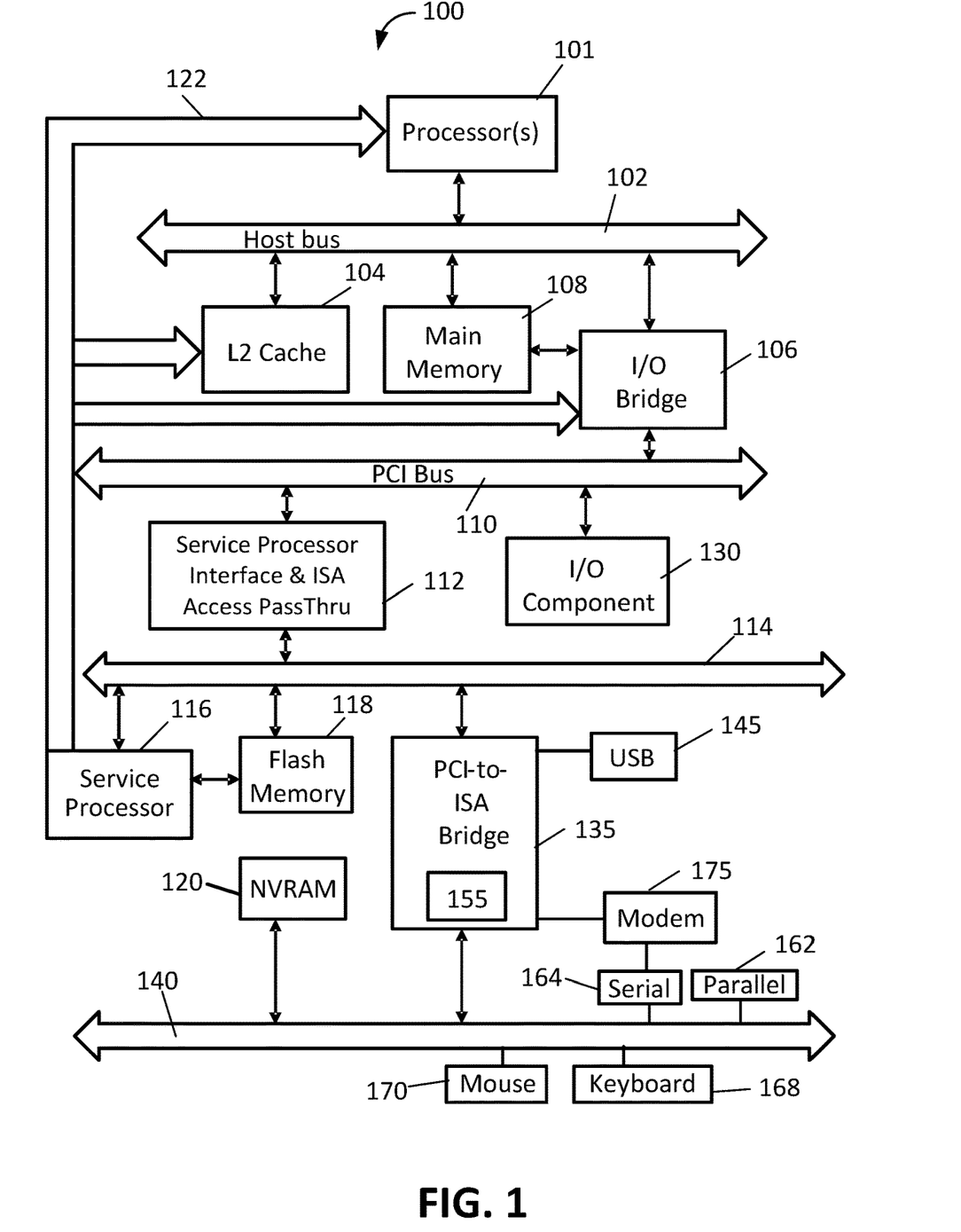
FIG. 1 depicts a general computing or data processing system in accordance with an embodiment.

FIG. 1 illustrates an information handling system 100 which may be a simplified example of a computer system capable of performing the operations described herein. Computer system 100 may include one or more processor(s) 101 which are coupled to a host bus 102. The processor(s) 101 may include, for example, an off-the-shelf microprocessor, custom processor, Field Programmable Gate Array (FPGA), Application Specific Integrated Circuit (ASIC), discrete logic, etc., or generally any device for executing instructions. In an example, the processor(s) 101 can be multicore processors including two or more processor cores. A level two (L2) cache memory 104 may be coupled to host bus 102. An I/O bridge (e.g., a Host-to-PCI bridge) 106 may be coupled to a main memory 108, where the I/O bridge may include cache memory and main memory control functions, and may provide bus control to handle transfers among a PCI bus 110, the processor 101, the L2 cache 104, the main memory 108, and the host bus 102. Main memory 108 may be coupled to the I/O bridge 106 as well as the host bus 102. Other types of memory, such as Random Access Memory (RAM), and/or various volatile and/or nonvolatile memory devices, may be coupled to the host bus 102 and/or the I/O bridge 106 as well. For example, memory devices coupled to the host bus 102 may include electrically erasable programmable read only memory (EEPROM), flash programmable read only memory (PROM), battery backup RAM, hard disk drives, etc. Nonvolatile memory devices coupled to the host bus 102 may be used for holding executable firmware and any nonvolatile data containing programming instructions that can be executed to cause the processor 101 to perform certain functions, such as the methods described herein. Devices used solely by processor(s) 101, such as I/O component(s) 130, may be coupled to PCI bus 110. Service Processor Interface and ISA Access Pass-through 112 may provide an interface between PCI bus 110 and PCI bus 114. In this manner, PCI bus 114 may be insulated from PCI bus 110. Devices, such as flash memory 118, are coupled to PCI bus 114. In one implementation, flash memory 118 may include BIOS code that incorporates necessary processor executable code for a variety of low-level system functions and system boot functions.

PCI bus 114 may provide an interface for a variety of devices that are shared by host processor(s) 101 and Service Processor 116 including, for example, flash memory 118. PCI-to-ISA bridge 135 provides bus control to handle transfers between PCI bus 114 and ISA bus 140, universal serial bus (USB) functionality 145, power management functionality 155, and can include other functional elements not shown, such as a real-time clock (RTC), DMA control, interrupt support, and system management bus support. Nonvolatile RAM 120 may be attached to ISA Bus 140. Service Processor 116 may include a bus 122 (e.g., JTAG and/or I2C bus) for communication with processor(s) 101 during initialization steps. The bus 122 may also be coupled to L2 cache 104, I/O bridge 106, and main memory 108 providing a communications path between processor 101, Service Processor 116, L2 cache 104, Host-to-PCI bridge, and main memory 108. Service Processor 116 also has access to system power resources for powering down information handling device 100.

Peripheral devices and input/output (I/O) devices can be attached to various interfaces (e.g., parallel interface 162, serial interface 164, keyboard interface 168, and mouse interface 170 coupled to ISA bus 140. Alternatively, many I/O devices can be accommodated by a super I/O controller (not shown) attached to ISA bus 140. Other interfaces that allow the processor(s) 101 to communicate with external devices may include, but are not limited to, serial interfaces such as RS-232, USB (Universal Serial Bus), Small Computer Systems Interface (SCSI), RS-309 or a wireless communication interface such as Wi-Fi, Bluetooth, near-field communication (NFC) or other wireless interfaces.

In an example, in order to attach computer system 100 to another computer system to copy files over a network, I/O component 130 may include a LAN card coupled to PCI bus 110. Similarly, to connect computer system 100 to an ISP to connect to the Internet using a telephone line connection, modem 175 is connected to serial port 164 and PCI-to-ISA Bridge 135.

While FIG. 1 shows one information handling system 100 that employs processor(s) 101, the information handling system may take many forms. For example, information handling system 100 may take the form of a desktop, server, portable, laptop, notebook, or other form factor computer or data processing system. Information handling system 100 may also take other form factors such as a personal digital assistant (PDA), smart phone, a gaming device, ATM machine, a portable telephone device, a communication device or other devices that include a processor and memory.

Figure 2:
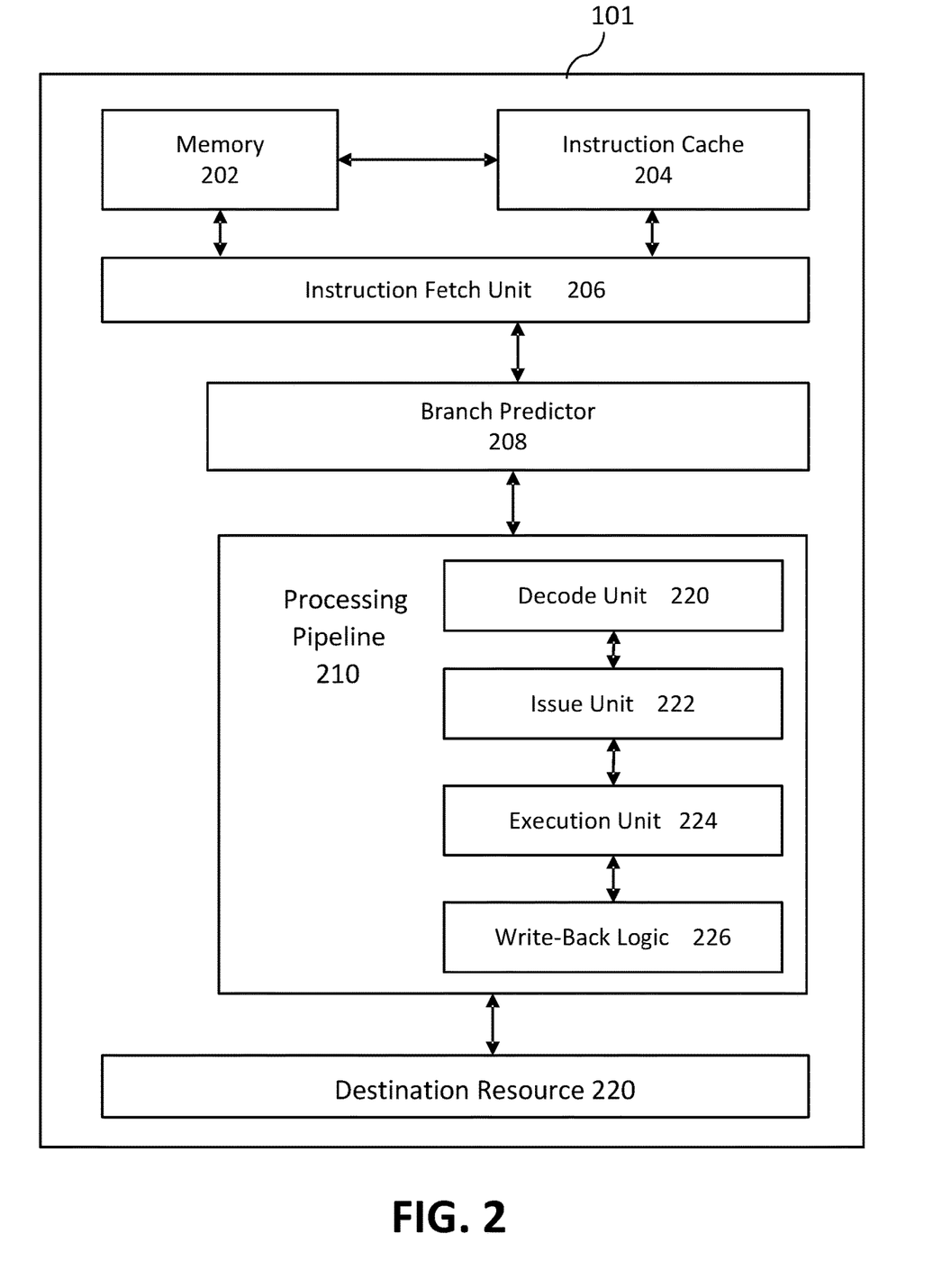
FIG. 2 depicts a block diagram of a processor in accordance with an embodiment.

FIG. 2 depicts a block diagram of a processor 101 according to an embodiment. The processor 101 may include at least a memory 202, an instruction cache 204, an instruction fetch unit 206, a branch predictor 208, and a processor pipeline or a processing pipeline 210. The processor 101 may be included within a computer processor or otherwise distributed within a computer system. Instructions and data can be stored in memory 202, and the instruction cache 204 may access instructions in memory 202 and store the instructions to be fetched. The memory 202 may include any type of volatile or nonvolatile memory, such as cache memory. The memory 202 and instruction cache 204 can include multiple cache levels. One or more data caches (e.g., a first level or L1 data cache and a second level or L2 data cache not depicted) can also be included in the processor 101. In one embodiment, instruction cache 204 may be configured to provide instructions in an 8-way set associative structure. Alternatively, any other desired configuration and size may be employed. For example, instruction cache 204 may be implemented as a fully associative, set associative, or direct mapped configuration.

In FIG. 2, a simplified example of the instruction fetch unit 206 and the processing pipeline 210 are depicted. In various embodiments, the processor 101 may include multiple processing pipelines 210 and instruction fetch units 206. In an embodiment, the processing pipeline 210 includes a decode unit 220, an issue unit 222, an execution unit 224, and write-back logic 226. In some examples, the instruction fetch unit 206 and/or the branch predictor 208 may also be part of the processing pipeline 210. The processing pipeline 210 may also include other features, such as error checking and handling logic, reorder buffer, one or more parallel paths through the processing pipeline 210, and other features now or hereafter known in the art. While a forward path through the processor 101 is depicted in FIG. 2, other feedback and signaling paths may be included between elements of the processor 101.

The instruction fetch unit 206 fetches instructions from the instruction cache 204 according to an instruction address, for further processing by the decode unit 220. The decode unit 220 decodes instructions and passes the decoded instructions, portions of instructions, or other decoded data to the issue unit 222. The decode unit 220 may also detect branch instructions which were not predicted by branch predictor 208. The issue unit 222 analyzes the instructions or other data and transmits the decoded instructions, portions of instructions, or other data to one or more execution units in the execution unit 224 based on the analysis. The execution unit 224 executes the instructions.

The execution unit 224 may include a plurality of execution units, such as fixed-point execution units, floating-point execution units, load/store execution units (e.g., load store unit denoted as LSU), and vector multimedia execution units. The write-back logic 226 writes results of instruction execution back to a destination resource 220. The destination resource 220 may be any type of resource, including registers, cache memory, other memory, I/O circuitry to communicate with other devices, other processing circuits, or any other type of destination for executed instructions or data.

In an example, an execution slice may be referred to as a set of data processing circuitry or hardware units connected in series within a processor core. An execution slice may be a pipeline or pipeline-like structure. Multiple execution slices may be used as part of simultaneous multi-threading within a processor core among multiple processor cores of a multiprocessor system. In modern computer architecture, there can be multiple execution units within an execution slice including LSUs, vector-scalar units (VSUs), arithmetic logic units (ALUs), among other execution units. A LSU as described in more detail in connection with FIG. 3 typically includes one or more store queues each having entries to track store instructions and hold store data, and one or more load queues each having entries to track load instructions and hold load data.

Branch instructions (or "branch") are types of instructions typically processed and/or handled in processor 101. Branch instructions can be either unconditional, meaning that the branch is taken every time that the instruction is encountered in the program, or conditional, meaning that the branch is either taken or not taken, depending upon a condition. The processor 101 can handle conditional branch instructions which allow a computer program to branch from one instruction to a target instruction (thereby skipping intermediate instructions, if any) if a condition is satisfied. If the condition is not satisfied, the next instruction after the branch instruction may be executed without branching to the target instruction. Most often, the instructions to be executed following a conditional branch are not known with certainty until the condition upon which the branch depends has been resolved. A branch predictor 208 can attempt to predict the outcome of conditional branch instructions in a program before the branch instruction is executed. If a branch is mispredicted, all of the speculative work, beyond the point in the program where the branch is encountered, is typically discarded. For example, when a conditional branch instruction is encountered, the processor 101 may predict which instruction will be executed after the outcome of the branch condition is known. Then, instead of stalling the processing pipeline 210 when the conditional branch instruction is issued, the processor may continue issuing instructions beginning with the predicted next instruction.

In an embodiment, processor 101 may perform branch prediction in order to speculatively fetch instructions subsequent to conditional branch instructions. Branch predictor 208 is included to perform such branch prediction operations. In an embodiment, instruction cache 204 may provide to the branch predictor 208 an indication of the instruction address being fetched, so that branch predictor 208 may determine which branch target addresses to select for forming a branch prediction. The branch predictor 208 may be coupled to various parts of the processing pipeline 210, such as, for example, execution unit 224, decode unit 220, reorder buffer, etc. to determine if the predicted branch direction is correct or incorrect. The execution unit 224, for example, can determine if the predicted branch direction is incorrect. The branch direction may be "taken", in which subsequent instructions are fetched from the target address of the branch instruction. Conversely, the branch direction may be "not taken", in which subsequent instructions are fetched from memory locations consecutive to the branch instruction. When a mispredicted branch instruction is detected, instructions subsequent to the mispredicted branch can be discarded from the various units of processor 101. One or more of the processor pipeline units may also provide information regarding the execution of conditional branch instructions to the branch predictor 208.

To facilitate multithreading, instructions from different threads can be interleaved in some fashion at some point in the overall processor pipeline. An example technique to interleave instructions from different threads involves interleaving instructions on a cycle-by-cycle basis based on interleaving rules. For example, instructions from the different threads can be interleaved such that a processor can perform an instruction from a first thread in a first clock cycle, and then an instruction from a second thread in a second clock cycle, and subsequently another instruction from the first thread in a third clock cycle and so forth. Some interleaving techniques may involve assigning a priority to each thread and then interleaving instructions from the different threads based on the assigned priorities. Various different interleaving rules can be set, such as rules designed for resolving threads with the same priority, or rules that interleave instructions from relatively less important threads periodically (e.g., performing instruction from a lower priority thread every X cycles).

In an embodiment, the processor 101 can be a SMT processor configured to perform multithreading. In an example, the processor 101 may be a multicore processor including two or more processor cores, and each core may be configured to process one or more threads. In an example, each processor core may be configured to process a respective thread. In another example, each processor core may be configured as a multithread processor that can process multiple threads.

For purposes of testing and/or debugging a processor it would be advantageous if hazards could be produced and/or generated in the processor on demand. In this regard it would be advantageous if hazards can be caused, produced, and/or created in the processor, and in an embodiment if a specific hazard can be caused, produced, and/or created in the processor where data is in a first level (L1) data cache for example for a load or store operation, but the data in the first level (L1) data cache is lost during processing, for example, to another processor core. It would be further advantageous if the hazard where a first level (L1) data cache unexpectedly loses its data during processing emulates a multi-core environment but can be generated in a single processor core environment.

In one or more embodiments, hazards can be created, produced, generated, and/or introduced in a processor (e.g., a processor core) that are controlled by firmware which can be turned on, triggered and/or activated, in an embodiment for validating a processor design or debugging a possible processor fail or error. In one or more examples, cache lines in a second level memory or second local memory, for example an L2 data cache, can be invalidated or killed which has the effect of invalidating or killing those cache lines in a first level memory or first local memory, e.g., a L1 data cache. That is, invalidating the cache lines in the second level (L2) cache memory will request the cache line back from, and invalidate the cache line in, the first level memory or first local memory, e.g., the L1 data cache. Having a system, mechanism, tool, and/or technique to invalidate the cache lines in the first level (L1) data cache can create a hazard for testing the processor. In one or more embodiments, the system, mechanism, tool, and/or technique to invalidate the cache lines in the first level (L1) data cache in a processor core can emulate a snoop hit from another processor core.

In an example implementation, a hardware unit triggers, activates, and/or runs a mechanism, and/or process that walks through, snoops, and/or searches the second level (L2) data cache to identify cache lines in the second level (L2) data cache to invalidate. In an embodiment, the mechanism and/or process identifies cache lines to invalidate in the second level (L2) data cache that have their inclusivity bit set in the second level (L2) data cache, and in a further aspect identifies at least one cache line in the second level (L2) data cache that has its inclusivity bit set. Having the inclusivity bit set in the second level (L2) cache, in an embodiment, indicates that the cache line is in the first level (L1) data cache. There can be other implementations, and the mechanism and/or process can implement an invalidation algorithm that takes many forms for searching (e.g., walking through) the second level (L2) data cache looking for cache lines. For example, the invalidating algorithm can include a search, for example, a walk through or snoop, for only the even cache lines in a second level local memory (e.g., the L2 data cache) with their inclusivity bit set. In another implementation, the invalidation algorithm can randomly pick a congruence class and invalidate all its elements if the inclusivity bit is set in the second level local memory (e.g., the L2 data cache). In another implementation, the invalidation algorithm can select cache lines in the second level (L2) data cache to invalidate that are not even in the first level (L1) data cache, and thus includes cache lines in the second level (L2) data cache that do not even have their inclusivity bit set. Other implementations for the scope of the search of the second level (L2) data cache for cache lines to invalidate are contemplated and the invalidation algorithm can take many different forms.

Figure 3:
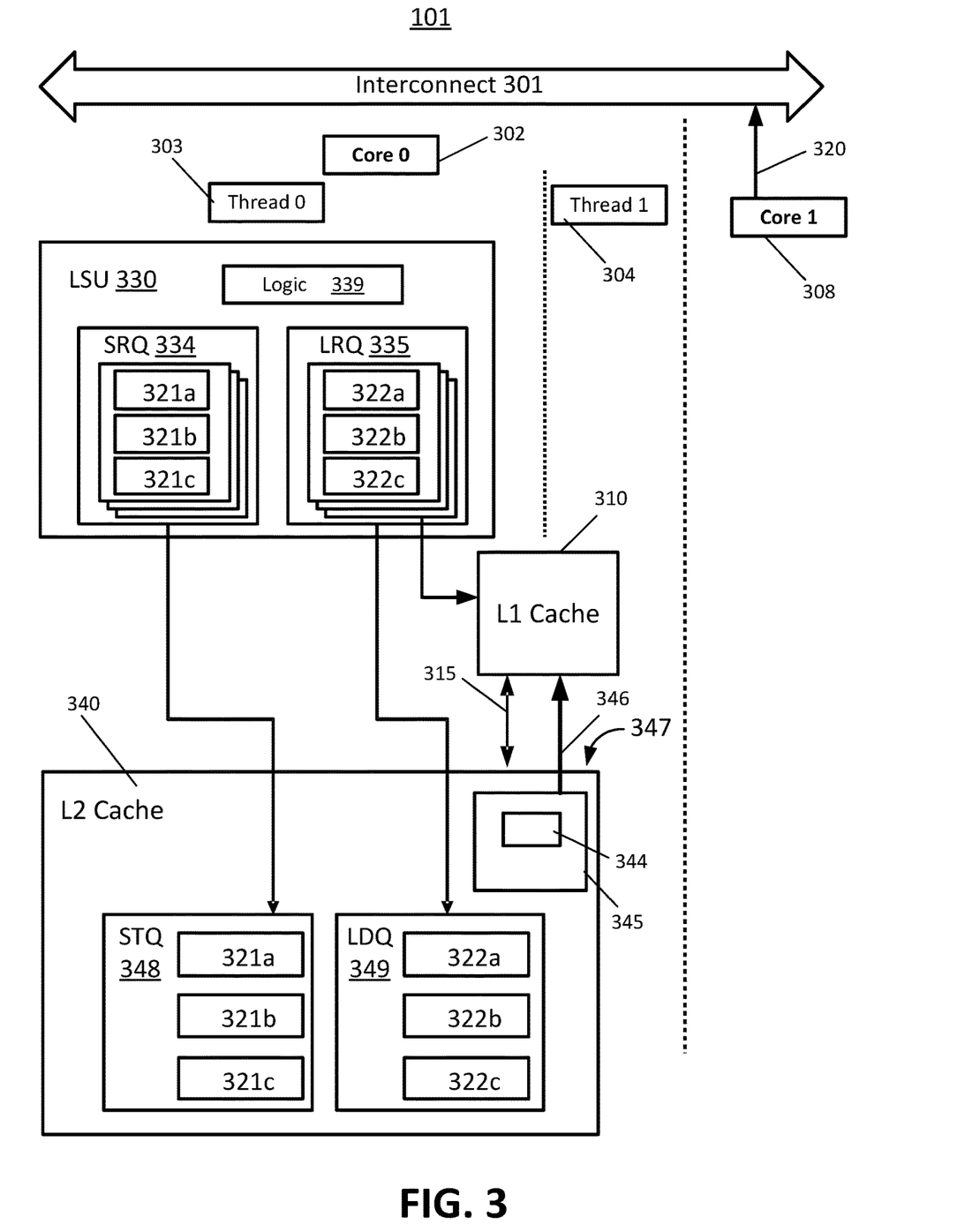
FIG. 3 illustrates an example block diagram of a portion of a processor having a hazard generating system, mechanism, and/or tool for generating and/or introducing a hazard into a core of a processor according to in an embodiment.

FIG. 3 illustrates an example implementation of activating a system, mechanism, tool and/or feature designed to trigger, generate, cause, and/or introduce a hazard in a processor, which can be used to test processor, more specifically a system, mechanism, and/or tool 347 that can be selectively engaged, preferably by firmware, to create a scenario where a first level local memory (e.g., L1 data cache) unexpectedly loses its data (cache line), which in an aspect is similar to how a first level (L1) data cache would lose its data to another processor core.

In the example of FIG. 3, the processor 101 can be a multicore processor that includes multiple processor cores, e.g., processor core 0 (302) and processor core 1 (308), connected to one another via an interconnect 301 (e.g., a bus, mesh network, crossbar, etc.). Each of Core 0 (302) and Core 1 (308) can be configured to process multiple threads. For example, Core 0 (302) can be configured to process thread 0 (303) and thread 1 (304). While FIG. 3 shows a processor 101 having multiple processor cores for purposes of explanation, it can be appreciated that processor 101 implementing the hazard generating system, mechanism, tool, and/or technique 347 can have a single processor core, e.g., processor core 0 (302). Thread 0 (303) and thread 1 (304), along with other threads running on core 0 (302), can access first level or first local memory, e.g., L1 data cache 310, private to processor core 0 (302). Thread 0 (303) can include an instruction stream having store and load instructions. Core 0 (302) can contain and/or implement Load Store Unit (LSU) 330 to process and/or execute the store and load instructions.

The LSU 330 can include a store reorder queue (SRQ) 334 that can be configured to hold and store SRQ entries representing committed store instructions, e.g., 321a, 321b, 321c, etc. The committed store instructions in SRQ 334 can be completed store instructions, but since they are stored in SRQ 334, only core 0 (302) is aware that the store instructions in the SRQ 334 are completed. The LSU 330 can also include a load refresh queue (LRQ) 335 that can be configured to hold and/or store LRQ entries representing load instructions 322a, 322b, 322c that are waiting to be completed. The load instructions 322a, 322b, 322c can include respective target memory locations to load or fetch data from, but since they are held in the LRQ 335, only Core 0 (302) is aware of the target locations being indicated by load instructions 322a, 322b, 322c.

Core 0 (302) in processor 101 of FIG. 3 can include first level local memory 310 private to core 0 (302). For example, the memory locations or addresses of the first level local memory 310 can be local to (or accessible by) core 0 (302) and one or more threads running on core 0 (302), but inaccessible by Core 1 (308) or any other processor core. First level local memory 310 can be, for example, a L1 data cache or a memory block including an L1 cache. Core 1 (308) can include its own local memory (not shown) that is private to core 1 (308) and not accessible by core 0 (302). Processor 101 of FIG. 3 further includes a second level local memory 340 having memory locations or addresses that are private to processor core 0 (302), and not accessible by core 1 (308) or any other processor core. The second level local memory 340 can be, for example a L2 data cache, a memory block including a L2 data cache, or other higher level memory devices. The first level local memory 310 is generally smaller and faster than the second level local memory 340, where operations between the first level local memory 310, e.g., the L1 data cache, and an execution unit, e.g., LSU 330, takes 1-2 cycles, whereas operations between the second level local memory 340, e.g., the L2 data cache, and an execution unit, e.g., LSU 330, takes on the order of 10 cycles. Data 315 can be exchanged and/or moved between first level local memory 310 (e.g., L1 data cache 310) and second level local memory 340, (e.g., L2 data cache 340).

In a multi-core processor with multiple data caches, the one or more data caches need to maintain cache coherency. Cache coherency can be a problem because it is possible to have two or more caches having copies of the same cache line and if two threads make appropriate serialized changes to those cache lines in the two different caches, the result could be that both caches end up with different versions of the cache line, e.g., different data in the same cache line in the two different caches, and thus the caches would no longer be coherent. Snooping is the logic used to resolve the problem of cache consistency (e.g., cache coherency). Snooping logic in the processor broadcasts a message over the bus interconnecting the processor cores (e.g., interconnect 301) each time a cache line (e.g., data/a word) in its memory cache changes. The snooping logic also snoops on the bus (e.g., interconnect 301) looking for such broadcast messages from other processors. For example, in FIG. 3, when processor core 1 (308) changes a value in its data cache(s) a snoop hit 320 is sent by processor core 1 (308) on interconnect 301 to the other processor cores, e.g., processor core 0 (302). When a processor detects that another processor has changed a value at an address existing in its own cache (i.e., detects a snoop hit), the snooping logic invalidates that entry in its cache(s). The manner in which the processor core can invalidate the entries in its different levels of data caches can vary by the processor architecture, but in the embodiment of FIG. 3 the second level (L2) data cache 340 generally owns the cache line, and if the cache line is in and owned by a first level (L1) data cache 310, then an inclusivity bit is set in the second level (L2) data cache 340 for that cache line in the first level (L1) data cache 310.

The second level local memory 340, e.g., L2 data cache 340, can include a store queue (STQ) 348 and a load queue (LDQ) 349 that are accessible by processor core 0 (302). The STQ 348 can be configured to hold or store SRQ entries drained from the SRQ 334 in the LSU 330. For example, the SRQ 334 may drain its SRQ entries representing the store instructions 321a, 321b, 321c to the STQ 348, such that data being written or updated by the store instructions 321a, 321b, 321c reside in the second level local memory, e.g., the L2 data cache 340. The LDQ 349 can be configured to hold or store entries drained from the LRQ 335 in the LSU 330. In an example, a LRQ entry in the LRQ 335 can be drained to the LDQ 349 to request data, or to request a cache line to be loaded from the second level local memory 340, e.g., the L2 data cache 340, to the first level local memory 310, e.g., L1 data cache 310, the LSU 330, or to core 0 (302). The LRQ entries in the LRQ 335 can be drained sequentially, such that older load instructions may request its data before younger load instructions.

The LSU 330 may be configured to execute logic 339 to properly execute load and store instructions in an out-of-order processor. To test whether logic 339 is functioning correctly the ability to trigger, activate, introduce, produce, generate, and/or create hazards, including hazards that effect out-of-order processing, for example, situations and scenarios where data in a local data cache of a processor core is unexpectedly lost, similar to the situation where data in a local data cache of a first processor core is lost to a second different processor core, would be beneficial and assist with testing processor designs. In an embodiment, a system, mechanism, and/or tool 347, including a technique, can be implemented, preferably selectively triggered and/or initiated, that has the second level local memory, e.g., the L2 data cache 340, invalidate or kill a cache line in the first level local memory, e.g., L1 data cache 310. This hazard stresses the processor 101 by creating a situation where the first level (L1) data cache loses its data unexpectedly.

In one or more embodiments, hardware 345 added to processor 101, and more specifically added to second level (L2) data cache 340, emulates a snoop hit from another processor for or regarding one or more cache lines that are present in the second level (L2) data cache, which has the effect of invalidating one or more cache lines that are present in the second level (L2) data cache, which will also have the effect of invalidating those same cache lines in the first level (L1) data cache. In one or more approaches, hardware 345 triggers a search, e.g., a walk through or snoop, according to an invalidation algorithm 344 for cache lines in the second level (L2) data cache 340, preferably one or more cache lines that have their inclusivity bit set in the second level (L2) data cache 340. Cache lines in the second level (L2) data cache 340 that match the criteria of the invalidating algorithm 344 are invalidated in the second level (L2) data cache. The same cache lines invalidated in the second level (L2) data cache 340 will be invalidated, if present, in the first level (L1) data cache 310. In an approach, the second level (L2) data cache 340, according to the processor architecture and design, will send signal 346 to the first level (L1) data cache 310 to invalidate the cache lines in the first level (L1) data cache 310 that were invalidated in the second level (L2) data cache 340. The communication 346 being sent from the second level (local) memory, e.g., the L2 data cache 340, will result in cache line(s) being invalidated in the first level (local) memory, e.g., the L1 data cache 310.

In the processor 101 of FIG. 3, the second level (local) memory 340, e.g., the L2 data core 340, owns the cache lines and has an inclusivity bit that is set to indicate when a cache line is in the first level (local) memory 110, e.g., L1 data cache 110, and owed by the first level (local) memory (e.g., L1 data cache 110). Searching the second level memory in an approach includes a walk through the second level memory comparing cache lines in the second level memory with invalidating criteria. In one or more embodiments, the invalidating criteria, e.g., the invalidation algorithm 344, which is used to identify cache lines to invalidate in the second level memory (e.g., the L2 data cache 340) reads the inclusivity bit set in the second level memory 340 to identify cache lines in the first level (local) memory 110. In an embodiment, the second level memory (e.g., L2 data cache 340) can be configured to invalidate all the cache lines with the inclusivity bit set in the second level memory (e.g., L2 data cache 340). That is, the invalidation algorithm 344 triggered by the hardware 345 to search (e.g., walk through and snoop) the cache lines in the second level memory (e.g., the L2 data cache 340) can be for all the cache lines in the second level memory (e.g., the L2 data cache 340) that have its inclusivity bit set (indicating the cache lines are in the first level (local) memory (e.g., the L1 data cache 310)).

In another embodiment, the invalidation algorithm 344 can be configured, preferably by firmware, to invalidate only even cache lines that have their inclusivity bit set in the second level memory (e.g., the L2 data cache 340). There can be other implementations, for example, a congruence class can be randomly selected and all the entries meeting the congruence class can be invalidated in the second level (L2) memory (e.g., L2 data cache 340), if the inclusivity bit is set. It is preferred that the system, mechanism, and/or tool 347, and/or technique, includes an invalidating algorithm 344 that selects cache lines in the second level memory (e.g., the L2 data cache) that invalidates one or more cache lines inclusive in the first level memory (e.g., the L1 data cache 310). That is the hazard generating system, mechanism, tool, and/or technique in a preferred embodiments searches for (e.g., includes an invalidating algorithm) that searches for one or more cache lines in the second level memory that are also in the first level memory and invalidates one or more of those cache lines in the second level memory to cause those one or more cache lines to be invalidated in the first level memory. In a further example, however, the invalidating algorithm 346 can include cache lines where the inclusivity bit is not set, which under those circumstances, the cache line would be invalidated in the second level (L2) memory (e.g., the L2 data cache 340) but not in the first level (L1) local memory (e.g., the L1 data cache 310).

It can be appreciated that in FIG. 3, the processor includes a first processor core (e.g., processor core 0 (302), a first local memory (e.g., L1 data cache 310), and a second local memory (e.g., L2 data cache 340) which are each private to the first processor core (e.g., processor core 0 (302)) and are not shared with other processor cores (e.g., processor core 1 (308)). It can be appreciated that the second level memory (e.g., the L2 data cache 340) in one or more embodiments can be shared between processor cores. That is, both processor core 0 (302) and processor core 1 (308) can share the second level memory (e.g., L2 data cache 340). In such a processor design, where the second level (L2) data cache is shared between two or more processors, a hazard generating system, mechanism, tool and/or technique, which can be located in the shared second level (L2) data cache in an example implementation or elsewhere, is triggered which has the effect of invalidating one or more cache lines in the first level (L1) data cache. In an embodiment, there may be more than one first level (L1) data cache above the shared second level (L2) data cache, in which case the invalidate command/signal can be sent to and received by all the first level (L1) data caches sharing the second level (L2) data cache, sent to and received by some of the first level (L1) data caches sharing the second level (L2) data cache, and/or sent to and received by one of the first level (L1) data caches sharing the second level (L2) data cache. The invalidate command and/or signal can be sent and/or received by the first level (L1) data caches in round robin fashion or by some other means.

Figure 4:
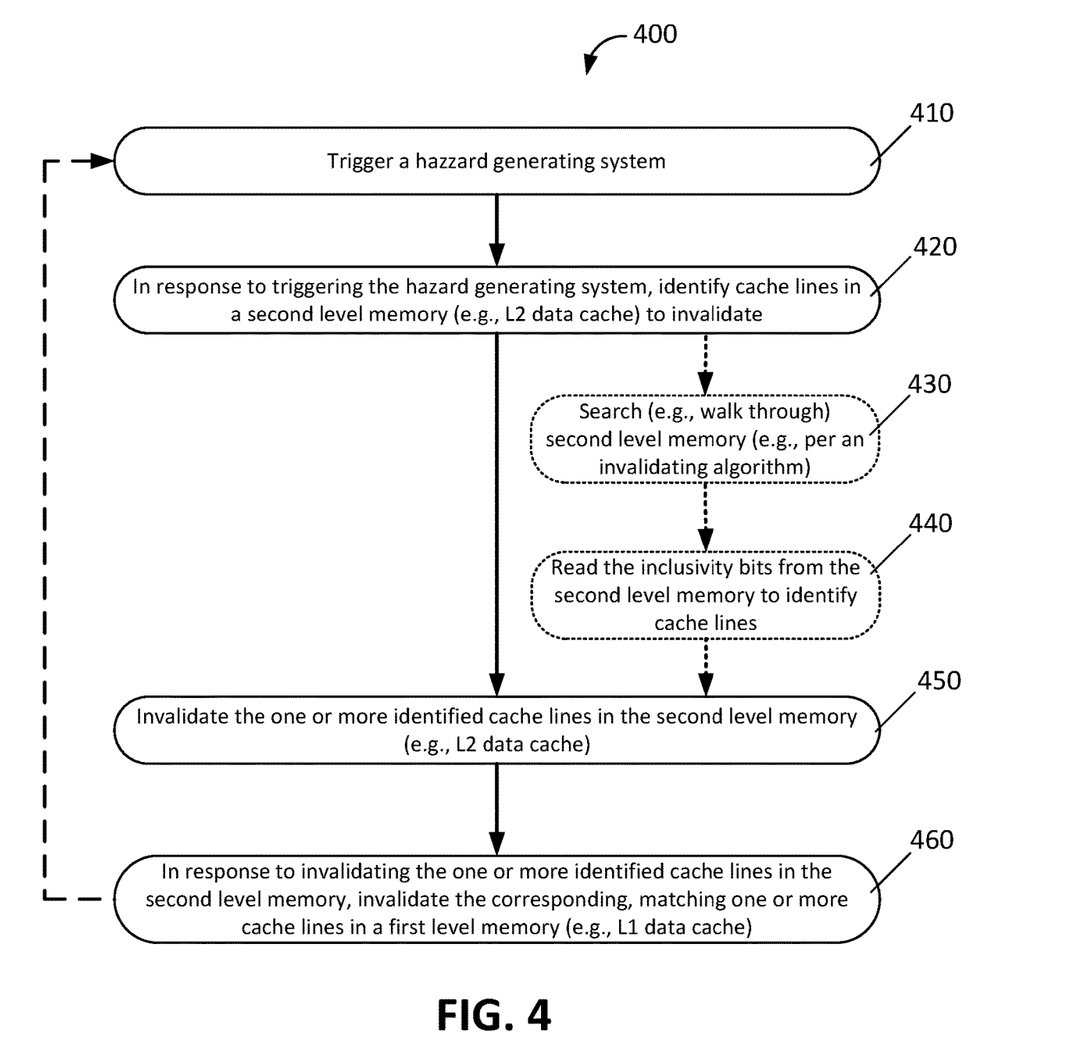
FIG. 4 illustrates an example flowchart of triggering, generating, and/or introducing a processing hazard in a core of a processor according to an embodiment, for example, the processor environment of FIG. 3.

FIG. 4 illustrates an example flowchart of a technique or method 400 of implementing a hazard in a processor, including in an embodiment making a first level memory, e.g., a L1 data cache, lose its data by, for example, invalidating one or more cache lines in the first level memory, e.g., the L1 data cache. While the process 400 is described for the sake of convenience and with an intent of limiting the disclosure as comprising a series and/or number of steps, it is to be understood that the process 400 does not need to be performed as a series and/or number of steps, and/or the steps do not need to be performed in the order shown and described with respect to FIG. 4, but the process 400 can be integrated and/or one or more steps can be performed together, simultaneously, or the steps can be performed in the order described or in an alternate order. The process 400 can include one or more operations, actions, or functions as illustrated by one or more of blocks of FIG. 4, and although illustrated as discrete blocks, various blocks can be divided into additional blocks, combined into fewer blocks, eliminated, performed in parallel, or performed in different order, depending on the desired implementation.

The process 400 can be implemented by one or more processing elements or cores in a data processing system, for example processor core 0 and processor core 1 as shown in FIG. 3. In an embodiment, the process 400 can be implemented in a single processor core environment, and can emulate a multi-core environment including a hazard generated in a multi-core environment when another processor core changes a cache line in a data cache in a first processor core. The process 400 may begin at 410 where during processing of instructions, preferably in an out-of-order processor, a hazard creating system, mechanism, and/or tool (e.g., system, mechanism, and/or tool 347) for creating, generating, and/or introducing a processing hazard is triggered and/or initiated, for example during validation testing of a processor. In one or more embodiments the hazard generating system, mechanism, and/or tool (347) is hardware (e.g., hardware 345) containing circuitry and logic to process instructions and/or implement process 400. At 420, in response to the hazard generating system, mechanism, and/or tool being triggered, cache lines to invalidate in a second level memory (e.g., L2 data cache) are identified.

The cache lines to invalidate in the second level memory (e.g., L2 data cache) can be identified in a number of different ways. In an embodiment, at 430, a search of, e.g., via a snooping process or walk through, the second level memory (e.g., L2 data cache) is performed or undertaken, and in an aspect the search is performed according to an invalidation algorithm (e.g., invalidating algorithm 344). The invalidating algorithm in an aspect defines the search through the second level memory (e.g., L2 data cache) to identify the cache lines in the second level memory (e.g., L2 data cache) to invalidate. The cache lines to invalidate in the second level memory (e.g., L2 data cache) preferably include in an embodiment at least one cache line that is also in the first level memory, e.g., the L1 data cache. Searching the second level memory at 430 in an approach includes a walk through the second level memory comparing cache lines in the second level memory with invalidating criteria.

The method 400 in one or more embodiments implements a search (e.g., a walk-through process) at 430 to identify cache lines to invalidate in the second level memory (e.g., L2 data cache), and the invalidating algorithm defines how the search (e.g., the walk-through process) is handled and/or performed. In one or more embodiments, the cache lines in the second level memory, e.g., the L2 data cache, are searched and cache lines in the second level memory, e.g., an L2 data cache, that have their inclusivity bit set, which indicates that the cache lines are also in the first level memory, e.g., the L1 data cache, are identified. That is, in one or more embodiments, the second level memory is searched (e.g., according to an invalidating algorithm) preferably to identify one or more cache lines in the second level memory that are also in the first level memory. Another invalidating algorithm that can be implemented by the hazard generating system can identify cache lines that have their inclusivity bit set, can identify only cache lines that have their inclusivity bit set, and/or can identify only even cache lines that have their inclusivity bit set. There can be many implementations of identifying the cache lines in the second level memory to invalidate, including implementing an invalidating algorithm that randomly picks a congruence class and invalidates all the cache lines if the cache line inclusivity bit is set. In this regard, in one or more approaches, at 440 the inclusivity bits from the second level memory (e.g., L2 data cache) are read to identify the cache lines in the second level memory (e.g., L2 data cache) to invalidate, and in an aspect the inclusivity bits read during the search (e.g., the walk through) of the second level memory (e.g., L2 data cache). In an approach, the cache lines that are identified to be invalidated in the second level memory can also include cache lines that are not in the first level memory and thus do not have their inclusivity bit set in the second level memory.

At 450, in response to identifying one or more cache lines to invalidate in the second level memory (e.g., L2 data cache), the one or more identified cache lines in the second level memory (e.g., L2 data cache) are invalidated in the second level memory (e.g., L2 data cache). In response to invalidating one or more identified cache lines in the second level memory (e.g., L2 data cache), at 460 the corresponding one or more cache lines in the first level memory (e.g., L1 data cache) are invalidated. That is, at 460 the cache lines in the first level memory (e.g., L1 data cache) that match the cache lines that were invalidated in the second level memory (e.g., L2 data cache) are invalidated in the first level memory (e.g., L1 data cache). In one or more approaches, the second level memory communicates with the first level memory to invalidate the corresponding one or more cache lines in the first level memory. That is, in one or more approaches, the second level memory, e.g., the L2 data cache, communicates (e.g., signal 346 in FIG. 3) the corresponding one or more cache lines to invalidate to the first level memory, e.g., the L1 data cache.

It can be appreciated that the cache lines identified for invalidation in the second level memory (e.g., L2 data cache) at 420, and invalidated at 450, may not identify any corresponding, matching cache lines in the first level memory (e.g., L1 data cache). It can be further appreciated that the process 400 can continue after 460 back to 420 where additional cache lines in the second level memory (e.g., L2 data cache) to invalidate are identified (optionally via steps 430-440), and those additional identified cache lines are invalidated at 450 in the second level memory (e.g., L2 data cache), and those identified cache lines in the first level memory are invalidated at 460 to the extent they are in the first level memory (e.g., L2 data cache). This looping process can be beneficial, and can be particularly beneficial where one or more loops do not identify cache lines in the first level memory (e.g., L1 data cache) to invalidate. The process 400 and hazard generating system can be configured to run for a number of loops where the number of times through steps 410-460 can be pre-set, predetermined, fixed, configurable, adjustable and/or programmable.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. It must also be noted that, as used in the specification and the appended claims, the singular forms "a", "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for generating a hazard in a processor, the method comprising:
   identifying one or more cache lines to invalidate in a second level memory of a processing core in the processor;

invalidating, in response to identifying the one or more cache lines to invalidate in the second level memory, the one or more identified cache lines in the second level memory; and invalidating, in response to invalidating the one or more identified cache lines in the second level memory, the corresponding one or more cache lines in a first level memory.

2. The method of claim 1, wherein:

the first level memory is a first level data cache in a processor core that is local to the processor core and the second level memory is a second level data cache in the processor, wherein the first level data cache is smaller and faster than the second level data cache.

3. The method of claim 2, wherein the second level data cache is local to the processor core.

4. The method of claim 1, wherein the processor is a multi-core processor and the method is performed in one of the processor cores of the multi-core processor.

5. The method of claim 1, further comprising triggering a hazard generating mechanism, wherein in response to triggering the hazard generating mechanism the hazard generating system identifies the one or more cache lines in the second level memory to invalidate.

6. The method of claim 5, further comprising triggering the hazard generating mechanism on demand.

7. The method of claim 5, further comprising triggering the hazard generating mechanism via firmware.

8. The method of claim 1, wherein identifying the one or more cache lines to invalidate in the second level memory comprises searching the second level memory.

9. The method of claim 8, wherein searching the second level memory comprises a walk through the second level memory comparing cache lines in the second level memory with invalidating criteria.

10. The method of claim 8, further comprising searching the second level memory according to an invalidating algorithm.

11. The method of claim 10, wherein the invalidating algorithm comprises identifying only even cache lines in the second level memory that have their inclusivity bit set, wherein setting the inclusivity bit in the second level memory indicates that the cache line is located in the first level memory.

12. The method of claim 1, wherein identifying the one or more cache lines in the second level memory to invalidate comprises reading an inclusivity bit in second level memory, wherein the inclusivity bit in the second level memory indicates the level of memory that owns a cache line.

13. The method of claim 1, further comprising the second level memory communicating with the first level memory to invalidate the corresponding one or more cache lines in the first level memory.

14. Programming instructions embedded on a non-transitory media, the programming instructions executable on a processor, wherein the programming instructions, in response to being executed on the processor, are configured to:

identify one or more cache lines to invalidate in a second level memory of a processing core in the processor;

invalidate, in response to identifying the one or more cache lines to invalidate in the second level memory-cache, the one or more identified cache lines in the second level memory; and invalidate, in response to invalidating the one or more identified cache lines in the second level memory, the corresponding one or more cache lines in a first level memory.

15. The programming instructions of claim 14, wherein the programming instructions, in response to being executed on the processor, are configured to trigger a hazard generating mechanism, wherein in response to triggering the hazard generating mechanism the hazard generating system identifies the one or more cache lines in the second level memory to invalidate.

16. The programming instructions of claim 15, wherein the programming instructions, in response to being executed on the processor, are configured to have the second level memory communicate with the first level memory the corresponding one or more cache lines in the first level memory to invalidate.

17. The programming instructions of claim 14, wherein the programming instructions to identify the one or more cache line to invalidate in the second level memory, in response to being executed on the processor, are configured to search the second level memory.

18. The programming instructions of claim 17, wherein the programming instructions to search the second level memory, in response to being executed on a processor, are configured to walk through the second level memory comparing cache lines in the second level memory with invalidating criteria.

19. The programming instructions of claim 17, wherein the programming instructions to search the second level memory, in response to being executed on a processor, are configured to search the second level memory according to an invalidating algorithm.

20. The programming instructions of claim 14, wherein the programming instructions to identify the one or more cache lines in the second level memory to invalidate, in response to being executed on a processor, are configured to read an inclusivity bit in second level memory, wherein the inclusivity bit in the second level memory indicates ownership of a cache line.

* * * * *